LIMITER CIRCUIT

Filed Aug. 21, 1963 2 Sheets-Sheet 1

INVENTORS
Leo K. Lugten
John P. Wittman
BY
C. A. Gulbrandsen
ATTY.

LIMITER CIRCUIT

Filed Aug. 21, 1963 2 Sheets-Sheet 2

INVENTORS
Leo K. Lugten
John P. Wittman
BY
C. R. Gullbrandsen
ATTY.

United States Patent Office 3,218,481

Patented Nov. 16, 1965

3,218,481

LIMITER CIRCUIT

Leo K. Lugten, Los Altos, and John P. Wittman, Santa Clara, Calif., assignors, by mesne assignments, to Automatic Electric Laboratories, Inc., Northlake, Ill., a corporation of Delaware Filed Aug. 21, 1963, Ser. No. 303,511

3 Claims. (Cl. 307—88.5)

This invention relates to signal conversion systems and more particularly to signal amplitude limiters which permit amplification to occur below the limiting level.

In both in-band and out-of-band signalling systems, some form of limiting of the information signal must be applied to eliminate false operation of the signal receiver. Ideally this limiter should be very linear, thus having no effect on the output for signals below the desired limit level. At the present time this limiting is accomplished in some in-band signalling systems by placing silicon diodes across the input of the signal conversion channels to limit the speech peaks to say, +12.5 dbm for a +20 dbm input.

For out-of-band signalling systems the maximum level is more critical, being restricted, for example, to +7 dbm for a +20 dbm input. Therefore a transformer is needed to step up the voltage to permit the diodes to be operated in their highly conductive region at lower input levels. In order to maintain a 600 ohm balanced system, the transformer secondary must be tapped or have two separate windings. One of the shortcomings of such an arrangement is that even a perfect short by the diodes is limited in its effect on the signal path by the leakage inductance of the transformer.

Results obtained with this type of limiter show that it is not possible to keep the maximum level below the required value without exceeding linearity requirements for the limiter circuit. If the maximum output level is maintained below that value, then the linearity requirements cannot be met.

It is therefore an object of the present invention to obtain an amplifier limiter circuit whose output is linear with respect to an input signal over a wide range of input signals, and yet will maintain the output level at a reasonably low level.

Other objectives and a fuller understanding of the invention may be had by referring to the following description of a preferred embodiment of the invention, taken in conjunction with the accompanying drawings in which.

Figure 1:
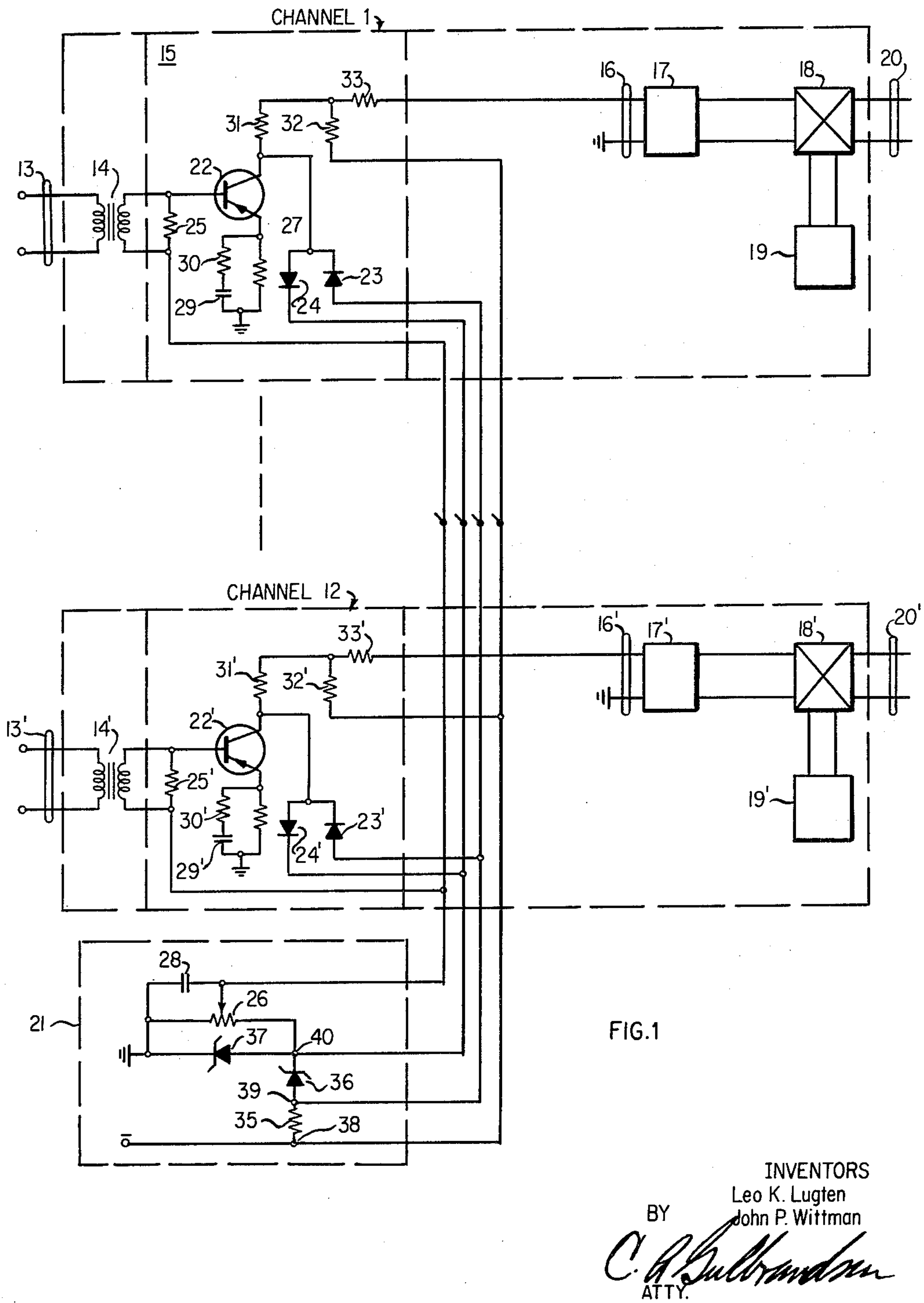
FIG. 1 shows an amplifier limiter circuit interposed between a voice frequency line and a modulator for a group of channels.

In FIG. 1 there is shown a group of identical signal conversion channels 1 through 12. Each channel consists of an input voice frequency line 13, an isolation transformer 14 to isolate the balanced input from the unbalanced amplifier circuit 15, amplifier limiter output line 16, bandpass or low pass filter 17 encompassing the voice frequency band, a modulator 18 to provide modulation of a carrier wave obtained from the carrier wave supply 19, and a modulator output line 20. The necessary voltages to operate the amplifier circuit 15 in each channel and also the reference voltages for the clamping diodes 23 and 24 used therein are obtained from the common supply 21. The combination of the amplifier circuit 15 and the common supply 21 is used to amplify signals on input line 13 until the reference voltages of 21 are exceeded, at which time output limiting will occur.

In the amplifier circuit 15 transistor 22 needs to provide only sufficient gain to overcome the insertion loss of transformer 14 and it also allows operation of diodes 23 and 24 in the proper region of their operating characteristics. Resistor 25 is used to match the secondary of transformer 14 to its primary. The emitter to base bias of transistor 22 is obtained by the voltage drop across variable resistor or potentiometer 26 in the common supply 21, and emitter resistor 27. This bias level for the transistor 22 in all twelve channels is adjustable by potentiometer 26.

During signal operation capacitor 28 bypasses potentiometer 26, and capacitor 29 bypasses emitter resistor 27. Resistor 30 is used to degenerate somewhat the gain of amplifier circuit 15. The load for the transistor 22 is composed of resistors 31, 32, 33 and the input impedance on line 16 of the filter 17.

In the common supply of reference voltages 21, resistor 35 and Zener diodes 36 and 37 are used both for providing the necessary operating voltages for transistor 22 and also to determine the clamping level of the diodes 23 and 24. A negative voltage sufficient to break down the Zener diodes is provided to the common supply 21 at 38 as shown. The clamping levels for diodes 23 and 24 are thus established at 39 and 40 respectively.

Figure 3:
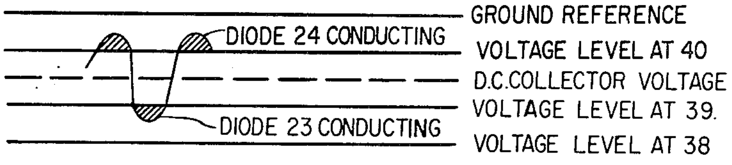
FIG. 3 is a diagram useful in explaining the operation of the invention.

In operation of the circuit of FIG. 1, a signal is present at the input voice frequency line 13. The bias level of transistor 22 is set by potentiometer 26 so that the collector voltage of transistor 22 is midway between the clamping voltages set at 39 and 40, as indicated in FIG. 3.

The resistors 31, 32 and 33, are chosen such that for input signals at line 13 below the desired clamping level, the signal voltage at the collector of transistor 22 will not exceed the voltage levels at 39 and 40.

Assume initially that the incoming signal on line 13 is of a low level. The signal voltage at the collector of transistor 22 will not exceed the clamping levels at 39 and 40, thus diodes 23 and 24 will be in their essentially nonconducting region. In this operation the diodes 23 and 24, and the Zener diodes 36 and 37 will have no effect on the output of amplifier 15.

Now make the assumption that the incoming signal on line 13 is of a high level. The signal voltage at the collector of transistor 22 will exceed the clamping levels at 39 and 40, thus diodes 23 and 24 will be in the conducting region. In this operation the low impedance of diodes 23 and 24, and of the Zener diodes 36 and 37, are placed in parallel with the transistor load, thereby clamping the output signal level on amplifier limiter output line 16 to the desired clamping level. This is shown clearly by FIG. 3 where the A.-C. signal at the collector exceeds the reference clamping voltages. The cross hatched areas denote regions where the diodes 23 and 24 are in their highly conductive state.

The fundamental of the output as a function of the input level was measured for the amplifier limiter circuit shown in FIG. 1. The circuit was constructed using the following as the most important component values: Transistor 22—2N404; resistor 25—600 ohms, 27—3160 ohms, 30—422 ohms, 31—5620 ohms, 32—562 ohms, 33—46.4 ohms; capacitor 29—10 microfarads. A negative voltage of 20.4 volts was supplied at 38 to establish reference voltages of −13.6 volts at 39 and −6.8 volts at 40. Potentiometer 26 was adjusted to make the collector voltage of transistor 22 be −6.8 volts, midway between 39 and 40. As the input signal was increased to +20 db above a reference transmission level, the output was very linear to +3.5 db input, deviating only 0.1 db at that point and was maintained well below +7 db above the reference transmission level up to the maximum +20 db input level. This circuit thus allowed linearity to +3.5 db input and yet maintained the output well below +7 db for higher input signal levels.

The arrangement shown in FIG. 1, is extremely simple and economical in utilizing a common supply of reference voltages 21 to provide the desired clamping voltages 39 and 40 for all channels. An additional benefit is obtained by this arrangement in that it allows the bias level for transistor 22 in all the channels to be adjusted by the single potentiometer 26.

Figure 2:
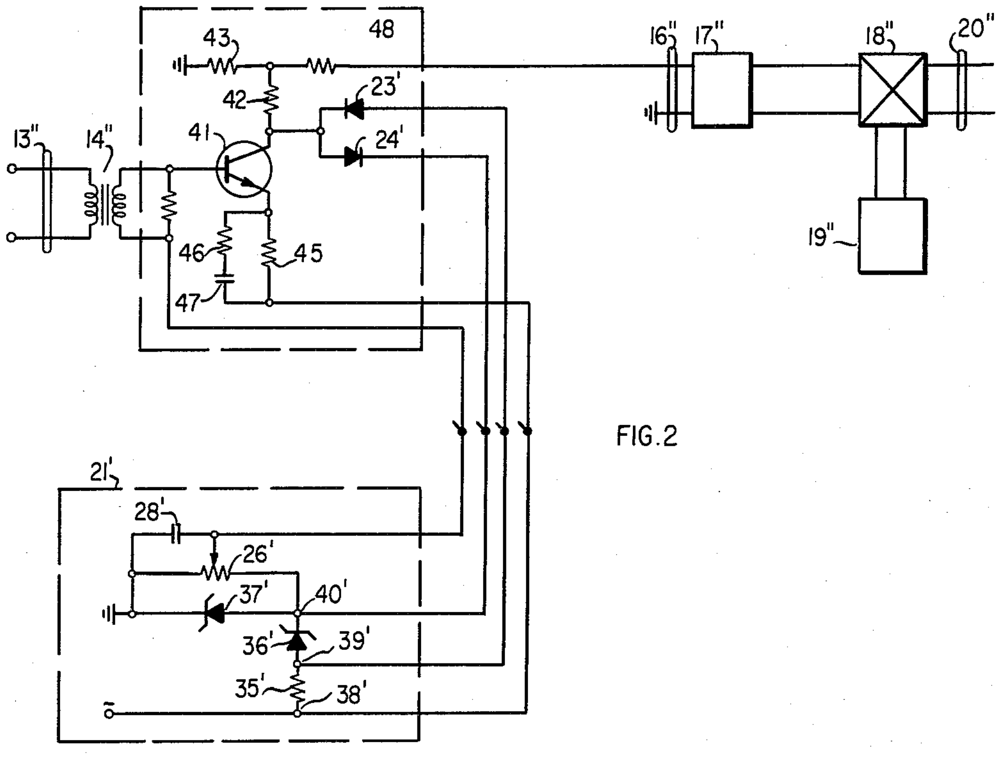
FIG. 2 shows an alternative form of the amplifier limiter.

FIG. 2 shows another embodiment of the invention, with transistor 41 being an NPN type. Resistors 42 and 43 are connected in series between the collector of transistor 41 and ground respectively. The output is taken from the intersection of resistors 42 and 43. The circuit arrangement of FIG. 2 allows the output of the amplifier limiter to be taken with respect to ground instead of to the negative potential at 38 of FIG. 1.

The circuit functions properly when item 35 is a resistor as herein described. However, this is illustrated as such by way of example and is not to be considered a limitation; since it is obvious to one skilled in the art that item 35 may also be a Zener diode of proper characteristics. In that case there would be a series string of Zener diodes—35, 36 and 37.

While we have described our invention with reference to a specific embodiment, it is to be clearly understood that this was done only by way of example and not as a limitation to the scope of the invention.

What is claimed is:

1. An amplifier limiter circuit comprising, in combination:

a transistor amplifier having an input and an output electrode;

input circuit means for impressing a signal on said input electrode;

output circuit means for normally deriving a corresponding amplified signal from said output electrode;

voltage supply means for providing first and second substantially-fixed reference potentials at first and second terminals;

biasing circuit means connecting said terminals to said amplifier to set the D.C. operating voltages on said electrodes;

voltage dividing means including at least one Zener diode connected between said first and second terminals to provide a third substantially-fixed reference potential at a third terminal; and diode means connected between said output electrode and said third terminal to limit the signal on said output electrode according to the value of said third reference potential.

2. An amplifier limiter circuit comprising a transistor amplifier having an input and an output electrode, an input circuit connected to said input electrode, an output circuit connected to said output electrode, a voltage source having first and second terminals with first and second substantially-fixed reference potentials thereon, a biasing circuit connecting said transistor amplifier to said voltage source to set the D.C. operating voltages on said input and output electrodes, a voltage divider having a plurality of Zener diodes serially connected between said first and second terminals, said Zener diodes being biased in their reverse breakdown regions to provide third and fourth terminals with third and fourth substantially-fixed reference potentials, thereon, said third and fourth reference potentials being, respectively, higher and lower than said D.C. operating voltage on said output electrode, a first and a second diode each having an anode and a cathode, said anode of said first diode and said cathode of said second diode connected to said output electrode, said cathode of said first diode connected to said third terminal, said anode of said second diode connected to said fourth terminal, whereby the voltage on said output electrode is substantially limited to the range between said third and fourth reference potentials.

3. A signal conversion system comprising:

a plurality of signal conversion channels each including input signal transformer means, a modulator, a carrier wave supply connected to said modulator, and an amplifier limiter interposed between said input signal transformer means and said modulator to limit the magnitude of signals arriving at said modulator, and a common supply of reference voltages including a voltage source having first and second terminals with first and second substantially-fixed potentials thereon and a voltage divider having a plurality of Zener diodes serially connected between said first and second terminals, said Zener diodes being biased in their reverse breakdown regions to provide third and fourth terminals with third and fourth substantially-fixed reference potentials thereon, said amplifier limiter in each signal conversion channel including a transistor amplifier having an input and an output electrode, a biasing circuit connecting said transistor amplifier to said voltage source to set the D.C. operating voltages on said input and output electrodes, a first and a second diode each having an anode and a cathode, said anode of said first diode and said cathode of said second diode connected to said output electrode, said cathode of said first diode connected to said third terminal, said anode of said second diode connected to said fourth terminal, whereby the voltage on said output electrode in each of said amplifier limiters is substantially limited to the range between said third and fourth reference potentials.

References Cited by the Examiner

UNITED STATES PATENTS

| | | | |
|---|---|---|---|
| 2,657,269 | 10/1953 | Starr | 332—14 X |
| 3,109,103 | 10/1963 | Wilhelmsen | 330—29 X |
| 3,139,562 | 6/1964 | Freeborn | 307—88.5 X |
| 3,143,711 | 8/1964 | Read | 300—29 X |

OTHER REFERENCES

Popular Electronics: "The Zener Diode," June 1961, pages 76 to 82 (only Figure 6, page 81, relied on).

ARTHUR GAUSS, *Primary Examiner.*